Patented Mar. 15, 1949

2,464,572

UNITED STATES PATENT OFFICE 2,464,572

PRODUCTION OF NITROPARAFFINS

Kenneth William Gee, Norton-on-Tees, England, assignor to Imperial Chemical Industries Limited, a corporation of Great Britain No Drawing. Application September 27, 1943, Serial No. 504,080. In Great Britain September 28, 1942

6 Claims. (Cl. 260—644)

This invention relates to the production of nitroparaffins.

It has already been proposed to produce nitroparaffins by heating in the gaseous phase nitrogen peroxide and one or more paraffins in the presence of catalysts comprising compounds of arsenic and/or antimony or materials containing the same.

I have now found that by heating in the gaseous phase nitrogen peroxide and one or more paraffins in the presence of a catalyst consisting of substantially pure metallic aluminium, improved yields of nitroparaffin or nitroparaffins, based on the paraffin or paraffins consumed, and an improved conversion of paraffin or paraffins to nitroparaffin or nitroparaffins are obtained.

The metallic aluminium may be such, for example, as used as a reagent in the laboratory, but satisfactory results are obtained with commercially available aluminium which contains only small amounts of impurities and/or alloying constituents, for example, a commercial aluminium containing 1.7% of copper, 1.3% of iron and traces of nickel has been found satisfactory.

The metallic aluminium may be in the form of turnings, powder, spheres or irregularly shaped fragments. If desired, the catalyst may be mixed with inert material such as fragments of refractory material, for example, fused silicia. This is particularly advantageous when the metallic aluminium is in the powdered form as the inert material then acts as a support.

When commencing to operate the process of the present invention, it has been found that with a new metallic aluminium catalyst, either alone or mixed with inert material, that is with a catalyst which has not previously been used in the process, the initial conversion of paraffin or paraffins to nitroparaffin or nitroparaffins and the yield of nitroparaffin or nitroparaffins are small, but as operation of the process continues the activity of the catalyst progressively increases to a maximum and then remains substantially stationary: the operating period required for the development of maximum catalyst activity may be, for example, about 20 hours.

I have further found however, that this activating period can be avoided if the catalyst is given a preliminary treatment, at elevated temperature, preferably at 300–400° C., with gaseous nitrogen peroxide alone or mixed with an inert gas, for example nitrogen, suitably for a period of 5 to 10 hours, although a longer or shorter time of treatment may be used.

It is desirable to use nitrogen peroxide free from other oxides of nitrogen, e. g. nitric oxide and nitrogen trioxide, and also to dry it before it reaches the catalyst, for example, by passage over silica gel or phosphorus pentoxide, as I have found that the presence of water and oxides of nitrogen other than the peroxide decreases the yield of nitroparaffin or nitroparaffins. The paraffin or paraffins may also be dried before reaching the catalyst. It is also desirable to avoid the presence of other gases, for example, nitrogen and oxygen, in the reactant mixture, as they tend to decrease the yield of nitroparaffin or nitroparaffins. The presence of free oxygen, for example, leads to the production of oxidation products of the paraffin or paraffins.

The upper temperature limit for optimum conversions and yield with a given catalyst depends on the paraffin or paraffins used, and on the time of contact of the reactants with the catalyst mass. In general, the upper temperature limit for optimum conversion and yield becomes lower with an increasing number of carbon atoms in the hydrocarbons used. When operating according to the present invention, the extent of oxidation of the paraffin or paraffins increases and the amount of nitration of the paraffin or paraffins decreases as the ignition temperature of such mixtures is approached. I prefer therefore to operate below the temperature at which the mixture of the paraffin or paraffins with nitrogen peroxide ignites, so that in general the upper temperature limit is fixed by the ignition temperature of such a mixture under the conditions of operation.

At the higher temperatures it is preferable to decrease both the time of contact of the initial substances with the catalyst and the ratio of nitrogen peroxide to paraffins. In the case for example, of the nitration of propane at atmospheric pressure according to the present invention, I have found that with a nitrogen peroxide/paraffin ratio of 1:1 it is desirable to operate at a temperature of 270° C., and an 80 seconds time of contact of the reactants with the catalyst. If the temperature of operation is increased to 300° C., with the same ratio of nitrogen peroxide to propane, the time of contact desirably is decreased to 40 seconds or less. At higher temperatures the yield of nitroparaffins is decreased and explosions may occur. In general, however, operation may be undertaken at temperatures higher than 300° C. by using nitrogen peroxide/paraffin ratios lower than 1:1, for example 1:10. Alternatively, if temperatures higher than 300° C. and ratios of nitrogen peroxide/paraffin higher than 1:1 are to be used, a diluent gas such as nitrogen may be added to the initial reactants in order to avoid explosions.

The reaction may be effected at atmospheric pressure but lower or higher pressures may be used if desired. For example a pressure of 75 lbs. per square inch has been found satisfactory for the nitration of propane. At the higher pressures it is desirable to operate at temperatures higher than when operating at atmospheric pressure, as a higher reaction rate can be obtained without decrease in yield. Irrespective of the pressure used, however, I have found that with the catalysts of the present invention, the improved yields and conversions are obtained at temperatures lower than those at which the best yields and conversions are obtained when using the catalysts known hitherto, under otherwise similar conditions. Furthermore, the crude products obtained are simpler mixtures, particularly when using the higher paraffin hydrocarbons.

The nitroparaffins may be recovered by cooling the gases leaving the reaction vessel. At the lower operating temperatures, the product is a single liquid phase and contains, in addition to nitroparaffins, dissolved nitrogen peroxide, small amounts of nitric acid and oxidation products of the paraffins such as fatty acids. The nitrogen peroxide may be removed from the product by decreasing the pressure over the product (degassing) or by the passage through it of a stream of air or an inert gas, and the remaining impurities may be washed out with water. At higher temperatures, for example, above 270° C., when nitrating propane, the product consists of two liquid phases, namely an upper layer of crude nitroparaffins and a lower layer of mainly dilute nitric acid from which products the nitroparaffins can be recovered by known means.

The production of nitroparaffins according to the present invention may be carried out in a cyclic process in which the exit gases from the reaction vessel are treated for the recovery of useful components, in addition to nitroparaffins. For example, in addition to recovery of the nitrocompounds produced in the reaction, the unreacted hydrocarbon or hydrocarbons and/or the nitrogen peroxide may be recovered and returned to the process. Furthermore, substantially the whole of the oxides of nitrogen may be recovered from the exit gases from the reaction vessel, treated to produce nitrogen peroxide which is then returned to the process. In this cyclic method of operation, I have found it desirable to remove nitric oxide and oxides of carbon, as these gases tend to cause oxidation of the hydrocarbons, with a consequent decrease in the yield of nitroparaffins.

*Example 1*

Propane at the rate of 6 litres per hour and nitrogen dioxide also at the rate of 6 litres per hour, were passed at atmospheric pressure into a glass converter packed with aluminium turnings maintained at a temperature of 260° C. The free space in the converter was such that the time of contact of the hot reactants with the aluminium was about 60 seconds. The products from the converter passed first through an air-cooled catchpot and then through three catchpots cooled by a mixture of methanol and solid carbon dioxide. The experiment was run for about 48 hours to allow steady conditions to be attained. The products obtained in the various catchpots during the succeeding 3.75 hours were bulked and nitrogen peroxide removed by decreasing the pressure over the bulked products after which they were steam distilled. It was found that 9.1% of the propane passed through the apparatus had been converted to nitroparaffin and 2.9% to oxides of carbon.

*Example 2*

A mixture of equal volumes of propane and nitrogen peroxide was passed over a catalyst consisting of commercial aluminium turnings containing 1.7% of copper, 1.3% of iron and a detectable amount of nickel. The catalyst was maintained at a temperature of 270° C. and the gas rates were so adjusted that the time of contact of the hot gas mixture with the catalyst was about 80 seconds. After leaving the catalyst, the exit gases were passed through three catchpots, the first cooled by air and the other two by a mixture of methanol and solid carbon dioxide. At the end of the experiment, the liquid propane which had condensed in the second and third catchpot was removed by allowing it to boil off and the product from all three catchpots bulked. Unreacted nitrogen peroxide was removed by passing a stream of carbon dioxide through the liquid and the nitroparaffin separated from the water and nitric acid formed as by-products in the reaction. The nitroparaffin obtained represented a conversion of 10% of the propane used whilst an exit gas analysis showed that 4% of the propane was being oxidised to carbon monoxide and carbon dioxide.

I claim:

1. A process for the production of nitroparaffins which comprises the steps of treating at elevated temperature a catalyst consisting of substantially pure metallic aluminium in fragmentary form, with gaseous nitrogen peroxide, subsequently heating in the gaseous phase nitrogen peroxide and at least one paraffin hydrocarbon in the presence of the treated catalyst.

2. A process for the production of nitroparaffins which comprises the steps of treating at elevated temperature a catalyst consisting of substantially pure metallic aluminium in fragmentary form with gaseous nitrogen peroxide admixed with an inert gas, subsequently heating in the gaseous phase nitrogen peroxide and at least one paraffin hydrocarbon in the presence of the treated catalyst.

3. A process for the production of nitroparaffins which comprises the steps of treating at a temperature of from 300° C. to 400° C. a catalyst consisting of substantially pure metallic aluminium in fragmentary form with gaseous nitrogen peroxide, subsequently heating in the gaseous phase nitrogen peroxide and at least one paraffin hydrocarbon in the presence of the treated catalyst.

4. A process for the production of nitroparaffins which comprises the steps of treating at a temperature of from 300° C. to 400° C. a catalyst consisting of substantially pure metallic aluminium in fragmentary form, with gaseous nitrogen peroxide, subsequently heating in the gaseous phase and in the presence of the treated catalyst a mixture of nitrogen peroxide and at least one paraffin hydrocarbon at a temperature below that at which the said mixture ignites.

5. A process for the production of nitroparaffins which comprises the steps of treating at elevated temperature a catalyst consisting of substantially pure metallic aluminium in fragmentary form with gaseous nitrogen peroxide, subsequently heating in the gaseous phase nitrogen peroxide and at least one paraffin hydrocarbon in the presence of the treated catalyst, treating the reaction products for the recovery of nitrocompounds, at least one paraffin hydrocarbon and oxides of nitrogen, treating the recovered oxides of nitrogen to produce nitrogen peroxide and returning the said nitrogen peroxide and at least one recovered hydrocarbon to the process.

6. A process for the production of nitroparaffins which comprises the steps of treating at a temperature of from 300° C. to 400° C. a catalyst consisting of substantially pure metallic aluminium in fragmentary form with gaseous nitrogen peroxide, subsequently heating in the gaseous phase and in the presence of the treated catalyst a mixture of nitrogen peroxide and at least one paraffin hydrocarbon at a temperature below that at which the said mixture ignites, treating the reaction products for the recovery of nitrocompounds, at least one paraffin hydrocarbon and oxides of nitrogen, treating the recovered oxides of nitrogen to produce nitrogen peroxide and returning the said nitrogen peroxide and at least one recovered hydrocarbon to the process.

KENNETH WILLIAM GEE.

REFERENCES CITED

The following references are of record in the file of this patent:

UNITED STATES PATENTS

| Number | Name | Date |
|---|---|---|
| 2,206,813 | Hass et al. | July 2, 1940 |
| 2,236,905 | Hodge et al. | Apr. 1, 1941 |
| 2,236,906 | Hodge et al. | Apr. 1, 1941 |